US006776087B1

(12) United States Patent
Amstad

(10) Patent No.: US 6,776,087 B1
(45) Date of Patent: Aug. 17, 2004

(54) FOOD PROCESSING MACHINE

(75) Inventor: John H. Amstad, Oro Valley, AZ (US)

(73) Assignee: The Amstad Family Revocable Trust, Oro Valley, AZ (US)

( * ) Notice: Subject to any disclaimer, the term of this patent is extended or adjusted under 35 U.S.C. 154(b) by 0 days.

(21) Appl. No.: 10/603,683

(22) Filed: Jun. 25, 2003

(51) Int. Cl.[7] .............................. A23N 7/00; A47J 17/00; A47J 17/14; A23L 1/00
(52) U.S. Cl. .............................. 99/540; 99/584; 99/624; 99/626; 99/630
(58) Field of Search .......................... 99/539, 540, 546, 99/639, 645, 623–630, 600, 601, 519, 518; 15/3.16, 3.19, 3.2; 426/481–483

(56) References Cited

U.S. PATENT DOCUMENTS

| 385,870 | A | * | 7/1888 | Melkersman | 426/483 |
|---|---|---|---|---|---|
| 2,355,810 | A | * | 8/1944 | Loewy | 426/483 |
| 3,134,413 | A | * | 5/1964 | Dorsa et al. | 99/627 |
| 3,460,162 | A | * | 8/1969 | Sijbring | 426/483 |
| 3,566,942 | A | * | 3/1971 | Smith | 99/625 |
| 3,703,200 | A | * | 11/1972 | Palyi et al. | 426/483 |
| 3,757,677 | A | | 9/1973 | Brady et al. | |
| 3,848,524 | A | | 11/1974 | Semrow | |
| 3,854,395 | A | * | 12/1974 | Hirahara | 99/630 |
| 3,946,658 | A | | 3/1976 | Smith | |
| 4,023,477 | A | * | 5/1977 | Hirahara et al. | 99/585 |
| 4,062,985 | A | | 12/1977 | Amstad | |
| 4,068,574 | A | | 1/1978 | Amstad | |
| 4,132,162 | A | | 1/1979 | Magnuson | |
| 4,143,593 | A | | 3/1979 | van Raay | |
| 4,230,034 | A | * | 10/1980 | Amstad | 99/587 |
| 4,237,782 | A | * | 12/1980 | Bichel | 99/625 |
| 4,258,069 | A | * | 3/1981 | Amstad | 426/483 |
| 4,325,297 | A | | 4/1982 | Weyant | |
| 4,442,764 | A | | 4/1984 | Bos et al. | |
| 4,448,118 | A | * | 5/1984 | Kunz | 99/624 |
| 4,519,305 | A | * | 5/1985 | Vanosdall | 99/625 |
| 4,572,445 | A | | 2/1986 | Cristante | |
| 4,621,573 | A | | 11/1986 | Lange | |
| 4,842,883 | A | | 6/1989 | Amstad | |
| 5,065,672 | A | | 11/1991 | Federighi, Sr. | |
| 5,106,641 | A | | 4/1992 | Bichel | |
| 5,245,918 | A | | 9/1993 | Volk, Sr. | |
| 5,245,919 | A | | 9/1993 | Neidigh | |
| 5,285,548 | A | | 2/1994 | Moll | |
| 5,329,845 | A | | 7/1994 | Bichel | |
| 5,431,094 | A | | 7/1995 | Savage, Sr. | |
| 5,617,783 | A | | 4/1997 | Beeler | |
| 5,662,034 | A | | 9/1997 | Fuhrman | |
| 5,704,281 | A | | 1/1998 | Huang | |
| RE35,789 | E | | 5/1998 | Amstad | |
| 5,752,436 | A | | 5/1998 | Fuhrman | |
| 5,780,088 | A | | 7/1998 | Zittel et al. | |
| 5,950,529 | A | | 9/1999 | Molloy | |

FOREIGN PATENT DOCUMENTS

| EP | 0 518 209 B1 | 10/1995 |
|---|---|---|
| EP | 0 714 241 B1 | 11/1999 |
| EP | 0 892 612 B1 | 10/2002 |
| EP | 1 139 837 B1 | 12/2002 |

* cited by examiner

Primary Examiner—Timothy F. Simone
(74) Attorney, Agent, or Firm—Gavin J. Milczarek-Desai; Durando Birdwell & Janke PLC

(57) ABSTRACT

A food processing machine having a product cleaning drum and an encircling product carrier shell disposed to define an annular product cleaning space therebetween. A waste collecting bell is concentrically mounted about the carrier shell to provide a waste collecting space therebetween and the carrier shell and collecting bell are interconnected. Separate mechanisms drive the cleaning drum and the interconnected carrier shell and collection bell to alter the magnitude of the centrifugal force that moves the products through the cleaning space and controls the amount of surface pressure applied to the products by abrading members carried on the periphery of the cleaning drum. Centrifugal force and the abrading members coact with frictional surfaces provided in the product movement path to move the products through the machine, while centrifugal force moves waste material from the cleaning space into the waste collecting space and out through a waste discharge mechanism.

25 Claims, 5 Drawing Sheets

FOOD PROCESSING MACHINE

BACKGROUND OF THE INVENTION

1. Field of the Invention

This invention relates in general to food processing machinery and more particularly to a machine for peeling, abrading, removing skin and surface blemishes, and the cleaning and polishing of various food products.

2. Description of the Related Art

It is well known that the peeling and cleaning of produce at a high rate with minimal waste and handling damage is important in the food handling industry. Attempts to accomplish this have presented difficulties due to many factors, including the highly irregular surfaces and size variations of certain produce such as potatoes. A significant difficulty is presented by the differences in density and the epidermis characteristics for different types of produce and different species of the same type of produce. These differences make it difficult to determine the optimum abrasive surface pressure for different types of produce to minimize bruising and other handling damage.

Various methods and devices have been developed in the past for this purpose with varying degrees of success. Other mechanical devices in the art often relied on gravitational tumbling of the produce in a peeling cage having an abrasive inner surface, with an auger being used to move the produce through the cage. Other devices use tubs having internal scraping surfaces such as carborundum and bristle spindles arranged in cascading frames or in a circular drum or trough structure. Most of these units have handling damage problems resulting from the tumbling action, auger-induced product movement, and the lack of contour action whereby the product has to be ground down to remove the deepest blemishes. Such shortcomings result in high produce losses and in excessive amounts of flushing water being used for removal of the waste. Environmental considerations associated with the difficulties in disposing of the flush water and waste, along with the other shortcomings, resulted in the development of various means for utilizing steam, chemicals, infrared rays, lasers and the like. Many of these attempts provided results that were less than desirable.

For example, when high pressure steam was used it only partially boiled off the skin and the produce, potatoes for example, had to be subsequently processed in a skin eliminator, which resulted in the use of large quantities of water.

Attempts have been made to overcome the excessive use of flush water, and various inventions are concerned with such attempts. These inventions include spindle drums, perforated drums or cages which are defined by spaced apart rods, or carborundum units. Moreover, attempts to save water have also consisted of simply not using water. However, such attempts result in machinery that becomes cloyed with waste products (e.g., starch) and inoperable in short order.

Applicant's U.S. Pat. No. Re.35,789 overcame many of the shortcomings of the related art. The disclosed structure includes inner and outer inverted frusto-conical cones which are arranged in a concentrically spaced relationship to provide a vertically diverging product cleaning space therebetween. The cones are rotatably driven so that centrifugal force applies horizontal and vertical components of force on the product being processed. The product is introduced into the center of the inner cone, moves horizontally through the product receiving vestibule at the bottom of the cones, and then moves angularly and upwardly through the product cleaning space. Centrifugal force holds the product in contact with the inner surface of the outer cone while abrading elements in the form of whips provided on the exterior surface of the inner cone accomplish the peeling, abrading, cleaning and polishing operations. The waste materials such as dirt and peelings are expelled under the influence of centrifugal force through apertures provided in the side wall of the outer cone. This disclosed structure does away with the need to use waste flushing water by using centrifugal force to accomplish the removal of waste materials. Also, the whips accomplish effective contour action to process the product with minimal handling damage. However in some instances, movement of the product through the structure has been less than ideal. For example, the product will sometimes bunch up in the transition area between the horizontal vestibule and the diverging product cleaning space.

Therefore, a need exists for a new and useful produce processing machine which overcomes some of the problems and shortcomings of the related art.

SUMMARY OF THE INVENTION

The invention relates in general to a novel food processing machine that includes two concentrically disposed drums that rotate about a horizontal axis. More particularly, the present invention discloses a machine having a cylindrical product cleaning drum mounted on a central shaft that is rotatably driven by a suitable drive means. A cylindrical product carrier shell is concentrically disposed relative to the cleaning drum and is spaced therefrom to provide an annular product cleaning space therebetween. A waste collecting bell of frusto-conical configuration is mounted in a concentrically spaced position about the carrier shell to provide a waste collecting space between the periphery of the carrier shell and the interior of the collecting bell. The carrier shell and the collecting bell are interconnected and are supported for rotation as a unit on trundle bearings with the rotational driving being provided by a second drive means. The products to be processed are fed into a feed chute from a suitable conveyer and deposited in a vestibule area at the input end of the machine. A transition area is provided between the vestibule area and the cleaning space with the transition area being defined by a frusto-conical nose cone on the front end of the cleaning drum and a similarly configured nose cone on the front end of the product carrier shell. Products introduced into the vestibule area will move into and through the diverging transition area into the annular cleaning space under the influence of centrifugal force produced by rotational driving of the cleaning drum and the interconnected carrier shell and waste collecting bell.

Preferably, the exterior peripheral surface of the cleaning drum nose cone is provided with abrading members in the form of whips, or bristles, with those disposed at the small end of the cone being relatively short and soft and those disposed between the small end and the larger end progressively increasing in length and stiffness. The products entering the transition area will be accelerated under the influence of centrifugal force and the diverging configuration of the area and will be gradually introduced to the abrading forces applied by the whips. Moreover, the abrading forces applied to the products in the transition area will rotate them and dislodge dirt and other foreign objects, which exit the area through suitable openings provided in the carrier shell's nose cone.

A plurality of abrading members in the form of bristles, or whips, are mounted in a manner to hereinafter be described, so as to substantially cover the peripheral surface of the cleaning drum. The whips are for abrading the surface of the products as they move through the cleaning space between the cleaning drum and the carrier shell. The surface pressure applied on the products is adjustably controlled by changing the rotational speed of the cleaning drum so that the machine can be used to either clean and polish the products without disturbing the skin or to peel and remove surface-imperfections. This adjustable capability is also effected by altering the differential rotational speeds of the cleaning drum and the interconnected carrier shell and collector bell and by driving them in counter rotating or co-rotating directions. The surface pressure can also be altered by employing adjustable ex-center devices to mount the cleaning drum on the drive shaft. The ex-center mounting devices are used to mount the cleaning drum with an adjustable eccentricity so the drum wobbles when it is rotatably driven.

The abrading whips are carried on a plurality of arcuate segments, preferably four or six in number, that are mounted so as to extend from the peripheral surface of the cleaning drum and are radially movable relative thereto. The radial movement of the segments is controlled automatically in a preferred embodiment by compression springs which bias the segments inwardly toward the cleaning drum and allow them to move radially outwardly under the influence of centrifugal force. Such radial movement is used to compensate for wear on the whips and to augment the application of surface pressure on the products by increasing the rotational speed of the cleaning drum and thereby increasing the radial extension of the segments. In another embodiment, the radial movement of the segments is mechanically adjusted to alter the radial extension of the arcuate segments from the periphery of the cleaning drum.

The carrier shell is provided with a plurality of openings, each having a diameter in the range of from one half (½) to two and one half (2½) inches and preferably two (2) inches. The openings are arranged in a closely spaced array so as to cover the entire cylindrical surface of the carrier shell and pass through the wall thereof. Preferably, a layer of soft deformable material, such as gum rubber, is affixed to the inner surface of the cylindrical wall so as to line the inner surface and underlay each of the openings provided in the shell's cylindrical wall. Centrifugal force exerted on the products moving through the cleaning space will press them into engagement with the deformable layer and the products will "nest" in the areas where the deformable material underlays the openings in the carrier shell wall. Such "nesting" of the products, along with the inherent frictional griping of the deformable layer, allows the whips to randomly rotate the products to thoroughly treat their surfaces. The deformable liner is provided with a plurality of relatively small openings in each of the areas thereof which underlie the larger openings provided in the wall of the carrier shell. Waste materials from the products being treated will be moved by centrifugal force through the holes in the deformable liner and will enter into the waste collecting space provided between the carrier shell and the collector bell. The waste materials will impinge on the inner surface of the waste collector bell and centrifugal force acting on the waste material will move it along the surface which diverges toward the product discharge end of the machine. Dust resulting from the product cleaning process is collected in a cowling which in a first embodiment encircles the outlet end of the collector bell and a tube is provided for connection to a source of negative pressure to provide a partial vacuum inside the cowling. Heavier waste materials that are held in engagement with the inner surface of the collector bell will slide off of the outlet end of the inner surface and in some cases will need to be scraped off, and, in either case, they are removed by suitable transporting and disposal equipment. In a second embodiment, the collector bell is formed of two pieces which are interconnected and configured to provide an annular opening in the wall of the collector bell. A dust collecting cowling circumscribes the collector bell in the area of the annular opening and a suitable source of negative pressure is coupled to the cowling.

The products being processed are pushed through the cleaning space between the cleaning drum and the carrier shell by the incoming products which are accelerated as they move into and through the transition area. When the products being processed reach the product discharge end of the cleaning drum they move onto an idler wheel which eases them down through a product collecting cowling and out through a discharge chute.

Residence time, that is the time that the products are in the cleaning space between the cleaning drum and the carrier shell, can be varied to suit the particular type of products being processed. The machine is supported on adjustable legs so that the machine can be tilted to change the angle of the rotational axis of the rotatably driven components relative to the horizontal.

DESCRIPTION OF THE PREFERRED EMBODIMENTS

Figure 1:
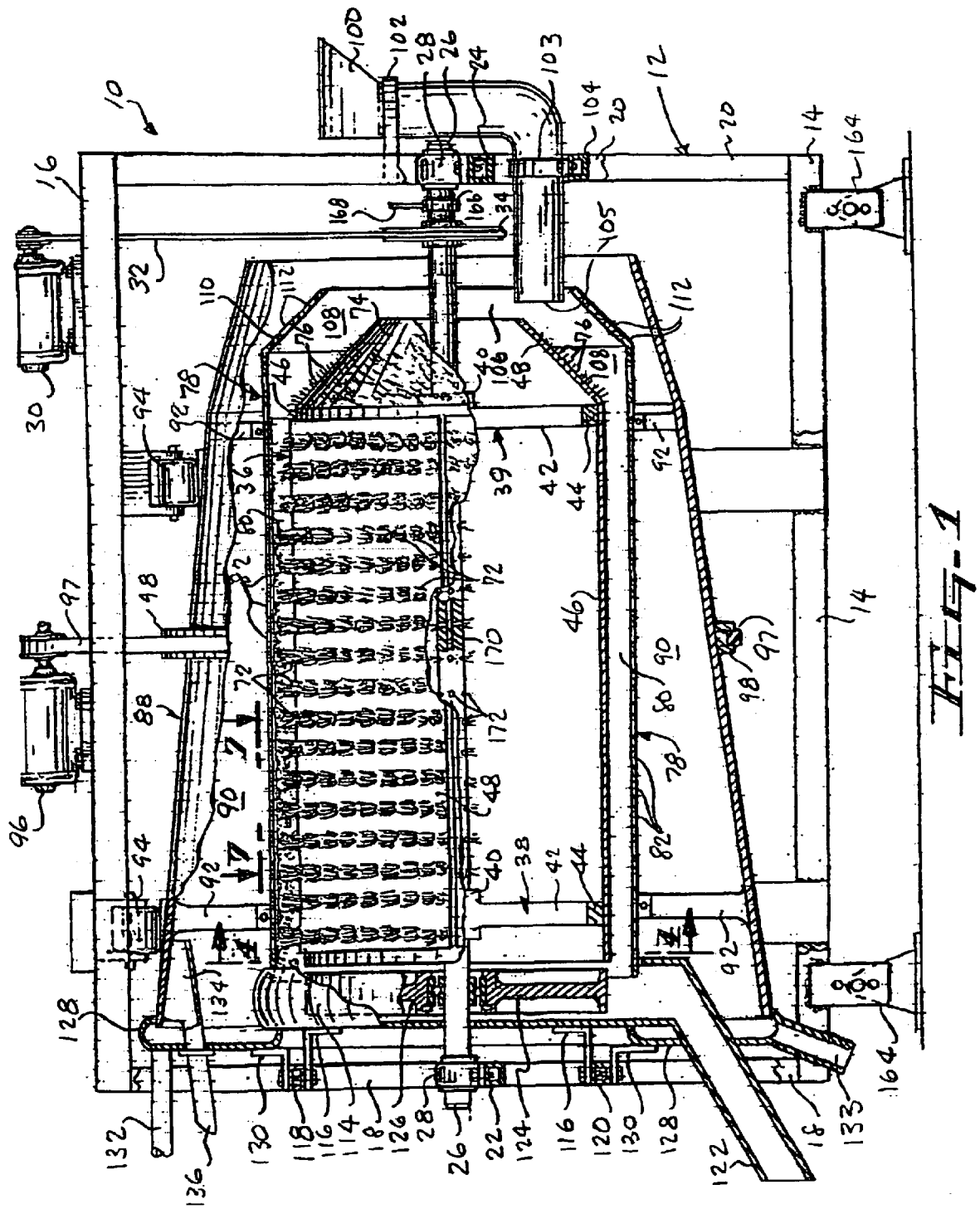
FIG. 1 is a side view of the food processing machine of the present invention with portions thereof broken away to show the various features thereof.
Figure 2:
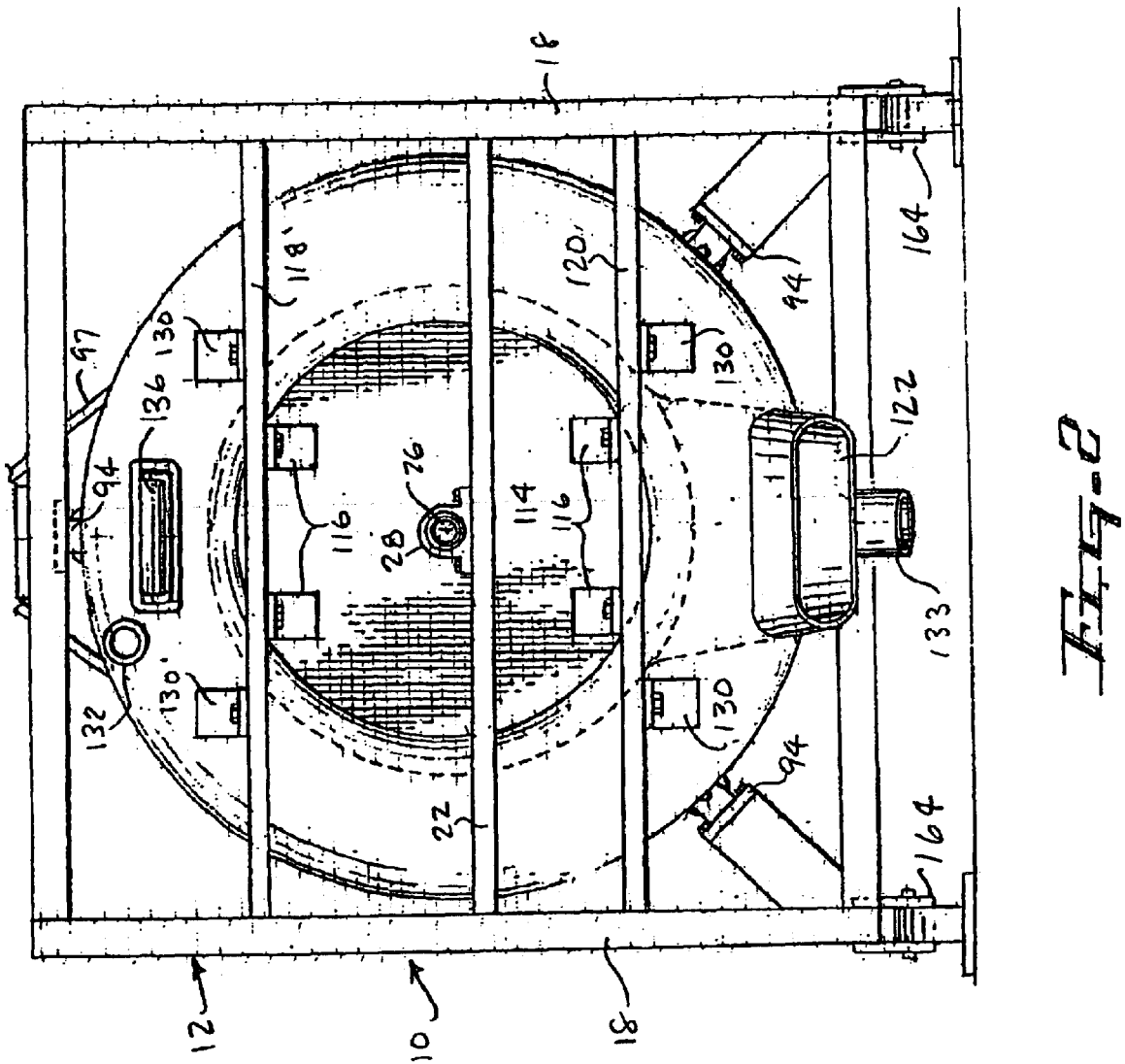
FIG. 2 is an end view showing the product discharge end of the food processing machine.
Figure 3:
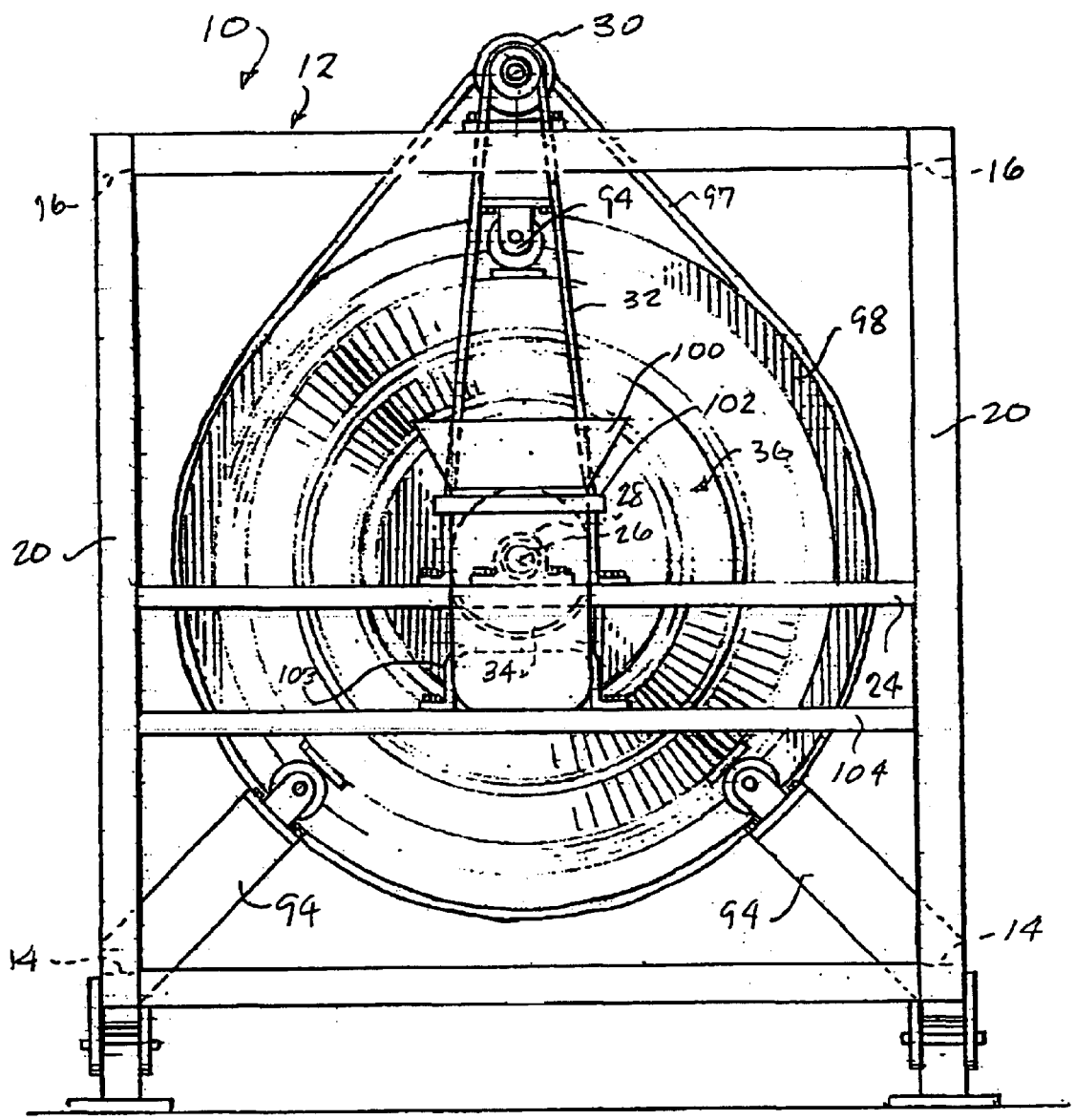
FIG. 3 is an end view showing the product feed end of the food processing machine.

Referring more particularly to the drawings, FIG. 1 shows the food processing machine of the present invention which is indicated in its entirety by the reference numeral 10. The machine 10 includes a frame 12 which has a spaced apart pair of horizontal bottom rails 14 and a spaced apart pair of horizontal top rails 16. The product discharge end of the machine 10, as seen best in FIG. 2, has a spaced apart pair of vertical end rails 18 and the product feed end, as seen best in FIG. 3, has a similar pair of vertical end rails 20. A cross rail 22 extends between the vertical end rails 18 at the discharge end of the machine 10 and a similar cross rail 24 extends between the vertical end rails 20 at the product feed end of the machine 10. An elongated drive shaft 26 is journaled for rotation in bearing means such as the illustrated pair of pillow blocks 28 that are carried on the cross rails 22 and 24. A drive means 30, shown as an electric motor, is mounted atop the frame 12 and belt 32 couples the rotary output of the motor to a driven pulley 34 that is mounted fast on the drive shaft 26.

Figure 4:
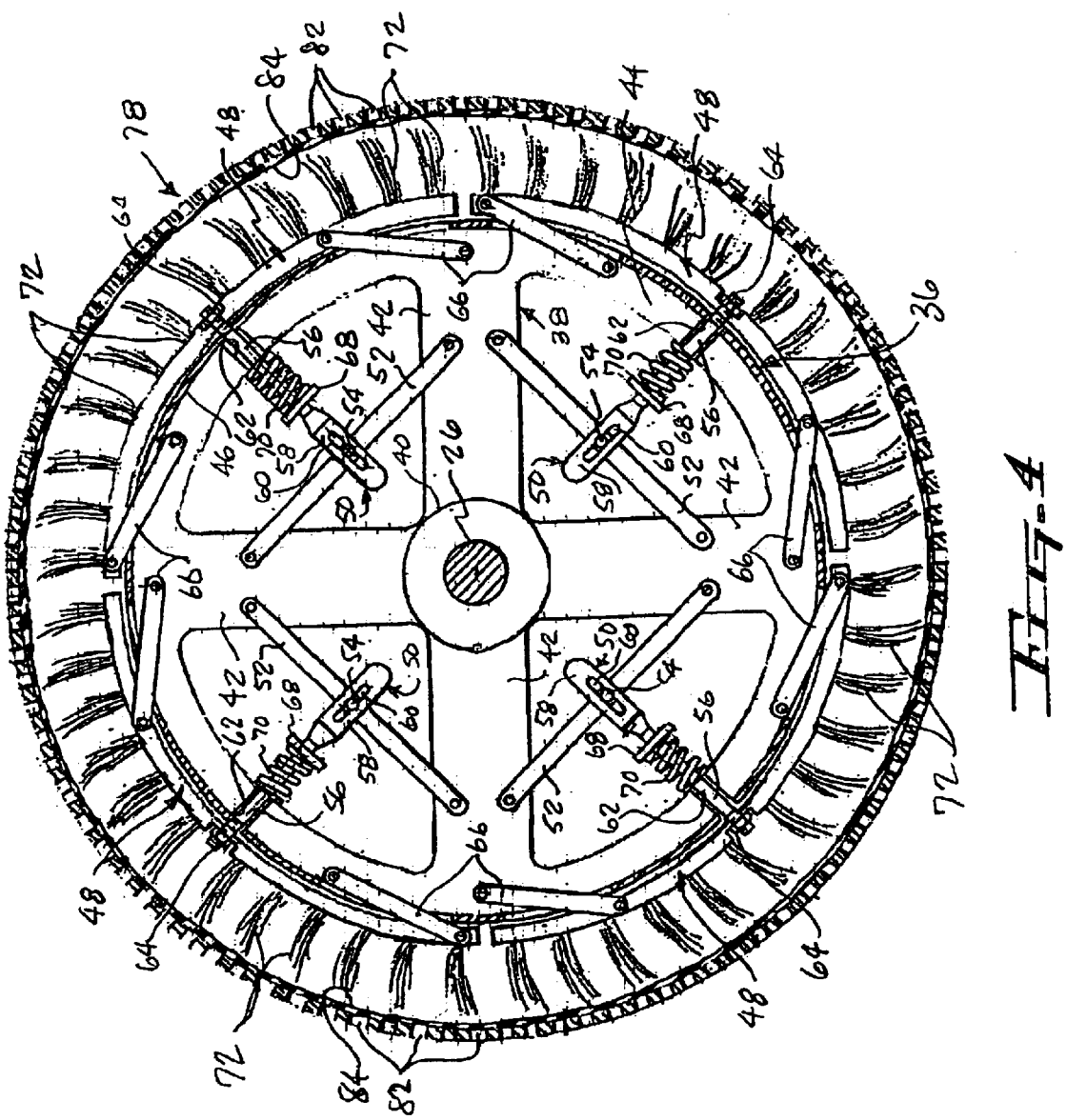
FIG. 4 is an enlarged sectional view taken along the line 4—4 of FIG. 1 to show radially adjustable whip carrying segments mounted on the product cleaning drum and disposed within the product carrier shell.

A product cleaning drum 36 is mounted on the drive shaft 26 by a spaced apart pair of identical wheel structures 38 and 39 so that the cleaning drum is rotatably driven by the drive shaft. Since the wheel structures 38 and 39 are the same, the following description of the wheel structure 38, as seen best in FIG. 4, will be understood to also apply to the wheel structure 39. The wheel structure 38 includes a hub 40 that is mounted on the drive shaft 26 and a plurality of spokes 42 extend from the hub with a circular rim 44 mounted on the extending ends of the spokes. The product cleaning drum 36 has a cylindrical body 46 which is mounted fast on the rims 44 of the wheel structures 38 and 39 so that rotational driving of the drive shaft 26 will drive the wheel structures which in turn drive the cleaning drum. A plurality of arcuate plate segments 48, which are preferably four (4) or six (6) in number, are circumferentially disposed relative to the cleaning drum 36. Each of the plate segments 48 are attached proximate one end thereof to a control assembly 50 which is mounted on the wheel structure 38. It will be understood that a structurally and operationally identical control assembly (not shown) is mounted on the other wheel structure 39 and is attached to the plate segment 48 proximate the other end thereof. In the illustrated embodiment, there are four control assemblies 50 carried on each of the wheel structures 38 and 39 and the following description of one of those assemblies is intended to apply to each of them.

Each of the control assemblies 50 includes a diagonal bar 52 mounted so as to extend between adjacent pairs of the spokes 42 of the wheel structure 38, and a pin 54 is transversely mounted on the bar intermediate its opposite ends. A rod 56 extends normally from the diagonal bar 52 and is coupled thereto by a clevis 58 provided on the proximal end of the rod. The clevis 58 straddles the diagonal bar 52 with the pin 54 thereof disposed within an elongated slot 60 formed in the clevis so that the rod 56 is radially movable relative to the wheel structure 38 within the limits established by the length of the slot 60. The rod 56 extends radially through an opening 62 formed in the rim 44 of the wheel structure 38 and the cylindrical body 46 of the cleaning drum 36. The distal end of the rod 56 is connected to the plate segment 48 as indicated at 64, with the rod, and the plate segment being radially extensible relative to the periphery the cleaning drum 36. A pair of links 66 each having one end connected to the wheel structure 38, extend tangentially from the wheel and have their opposite ends connected to the opposed side edges of the plate segment 48. The links 66 attach the plate segment to the rim 44 of the wheel structure 38 and control the movement of the plate segment 48 by keeping it from deviating from the desired radially extensible movement path. The rod 56 is provided with a disk shaped shoulder 68 and a compression spring 70 extends between the shoulder and the inside of the rim 44 of the wheel structure 38. Thus, each of the plate segments 48 are biased toward the periphery of the cylindrical body 46 of the cleaning drum 36. The peripheral surface of each of the plate segments 48 is provided with a plurality of abrading members 72 in the preferred form of an array of tufts of bristles or whips. The plate segments 48 will move radially under the influence of centrifugal force for reasons which will hereinafter be described in detail.

The cleaning drum 36 is provided with a frusto-conical nose cone 74 on the end thereof which is proximate the product feed end of the machine 10. The exterior peripheral surface of the cleaning drum nose cone 74 is provided with abrading members 76 in the form of bristles or whips, which are relatively short and soft at the small end of the cone and those disposed between the small end and the larger end progressively increase in length and stiffness. The abrading members 76 perform a preliminary cleaning of the products and gradually introduce them to the more aggressive forces of the abrading members 72.

Figure 8:
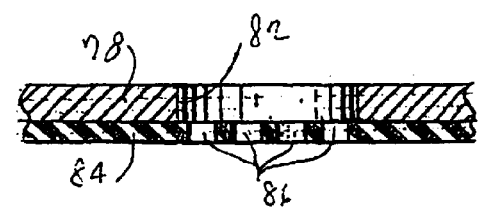
FIG. 8 is a sectional view taken along the line 8—8 of FIG. 7.
Figure 7:
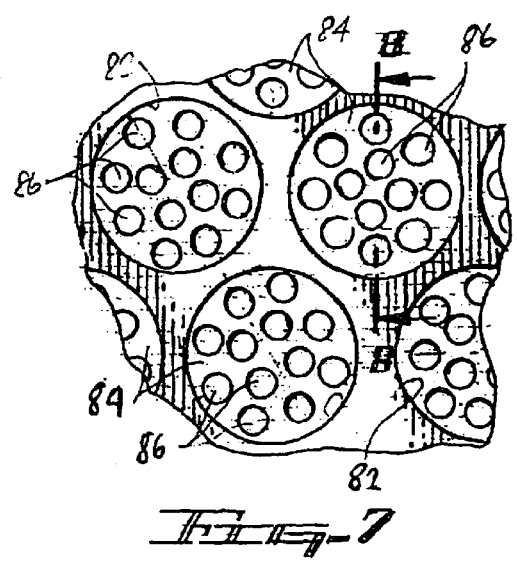
FIG. 7 is an enlarged fragmentary view taken along the line 7—7 of FIG. 1.

A cylindrical product carrier shell 78 is concentrically disposed relative to the cleaning drum 36 and is spaced therefrom to provide an annular product cleaning space 80 therebetween. The carrier shell 78 is provided with a plurality of openings 82, as seen best in FIGS. 7 and 8, each having a diameter in the range of from about one half (½) inch to about two and one half (2½) inches with two inches being preferred. The openings 82 are arranged in a closely spaced array so as to cover the entire cylindrical surface of the carrier shell 78 and pass through the wall thereof. A liner 84 of soft deformable material, such as gum rubber, is affixed to the inner surface of the carrier shell 78 so as to line the inner surface and underlay each of the openings 82 formed in the shell's cylindrical wall. The deformable liner 84 is provided with a plurality of relatively small openings 86 in each of the areas thereof which underlie the larger openings 82 provided in the wall of the carrier shell 78.

A waste collecting bell 88 of frusto-conical configuration is mounted in a concentrically spaced position about the carrier shell 78 to provide a waste collecting space 90 between the periphery of the carrier shell and the interior of the collecting bell. The carrier shell 78 and the collecting bell 88 are interconnected by suitable support members 92, shown in FIG. 1, and are supported for rotation as a unit on trundle bearings 94 with the rotational driving being provided by a second drive means 96 in the illustrated form of an electric motor. The second drive means 96 is mounted atop the machine's frame 12 and a belt 97 couples the rotary output of the drive means to a pulley 98 that is affixed to the periphery of the collecting bell 88. Both the first and second drive means 30 and 96 respectively, are preferably variable-speed reversible mechanisms for reasons which will hereinafter be described.

Products to be processed are fed into a feed chute 100 provided at the product feed end of the machine 10 from a suitable conveyer (not shown). The feed chute 100 is supported by a strap 102 that is attached to the cross-rail 24 and by a strap 103 that is attached to a similar cross-rail 104 that extends between the vertical end rails 20 of the frame 12. Products emerging from the outlet end 105 of the chute 100 enter a vestibule area 106 provided at the outlet end of the chute. Optionally, a retainer plate (not shown) may be affixed to outlet end 105 to prevent product from accidentally spilling out. A transition area 108 is located between the vestibule area 106 and the cleaning space 80 defined by the periphery of the cleaning drum 36 and the interior of the carrier shell 78. The transition area 108 is defined by the frusto-conical nose cone 74 on the front end of the cleaning drum 36 and a similarly configured nose cone 110 formed on the front end of the product carrier shell 78. The nose cone 110 of the product carrier shell 78 is formed of, for example, expanded metal, to provide a resistive surface which aids the passage of products through the transition area 108.

Products introduced into the vestibule area 106 will be subjected to centrifugal force which moves the products through the transition area 108 and presses them into engagement with the resistive surface of the nose cone 110. Therefore, movement of the products will be accelerated by the applied centrifugal force and they will be rotated by the abrading members 76 acting on the products that are being held in passive engagement with the resistive'surface of the nose cone 110. The abrading forces applied on the products moving through the transition area 108 will dislodge dirt and other foreign objects which exit the area through suitable openings 112 provided in the carrier shell's nose cone 110.

Upon moving from the transition area 108 into the cleaning space 80, centrifugal force acting on the products will press them into engagement with the deformable liner 84 and the products will "nest" in the areas where the deformable liner underlays the openings 82 in the carrier shell 78. The "nesting" disposition of the products, in addition to the inherent frictional gripping of the products provided by the liner, allows the abrading members 72 to randomly rotate the products to thoroughly treat the product surfaces. When the products reach the open discharge end of the cleaning space 80, they will move into the interior of a product collection cowling 114 which is supported by brackets 116 carried on upper and lower cross-rails 118 and 120 that extend between the vertical rails 18 of the frame 12. The product collection cowling 114 is disposed to inclose the open discharge end of the cleaning space 80 and has a product delivery chute 122 at the lower end thereof. Upon entering the interior of the product collection cowling 114 the products will move onto the peripheral surface of an idler wheel 124 which is mounted for free wheeling rotation on the drive shaft 26 by bearings 126. The idler wheel 124 acts on the products by easing them downwardly through the cowling 114 toward the delivery chute 122 rather than allowing them to drop directly toward the chute and possibly being bruised in the process. The products emerging from the product delivery chute 122 can be routed to a desired destination by a suitable conveyor belt (not shown).

Waste materials from the products being treated will be moved by centrifugal force through the holes 86 in the deformable liner 84 and will enter into the waste collecting space 90 between the carrier shell 78 and the collector bell 88. The waste materials entering the collecting space 90 will include some dust and other airborne debris. A waste collector cowling 128 which encloses the outlet end of the waste collecting area 90 is supported by suitable brackets 130 that are mounted on the cross-rails 118 and 120 at the product discharge end of the machine 10. A pipe 132 is mounted on the collector cowling 128 for connection to a suitable source of negative pressure (not shown) to provide a partial vacuum in the cowling.

The heavier waste materials will impinge on the inner surface of the waste collector bell 88 and centrifugal force will move those materials along the surface which diverges toward the product discharge end of the machine 10. Upon reaching the end of the collector bell 88, most of the heavier waste materials will simply slide out of the open end of the bell into a discharge trough 133 which extends through the dust collector cowling 128 and deposits the waste products onto a suitable refuse belt(not shown) for transport to a disposal site. Some of the heavier waste materials will adhere to the interior surface of the collector bell 88 and a scraper 134 is mounted on the dust collector cowling 128 to dislodge those waste materials and deposit them in a trough 136 through which they exit the machine 10.

Figure 5:
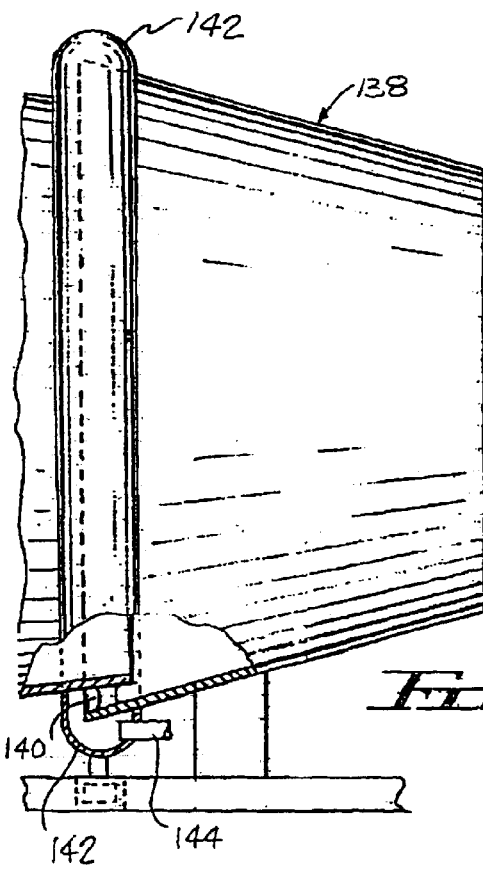
FIG. 5 is a partial side view of a second embodiment of product carrier shell with portions broken away to show the features thereof.

Reference is now made to FIG. 5 wherein a fragmentary portion of modified waste collecting bell 138 is shown. In this embodiment, the waste collecting bell 138 is a two piece structure that is joined intermediate its opposite ends to provide an annular opening 140 between the two pieces. A dust collector cowling 142 is positioned to inclose the annular opening and a tube 144 is mounted on the collector cowling 142 for connection to a suitable source of negative pressure (not shown) to provide a partial vacuum in the cowling.

Figure 6:
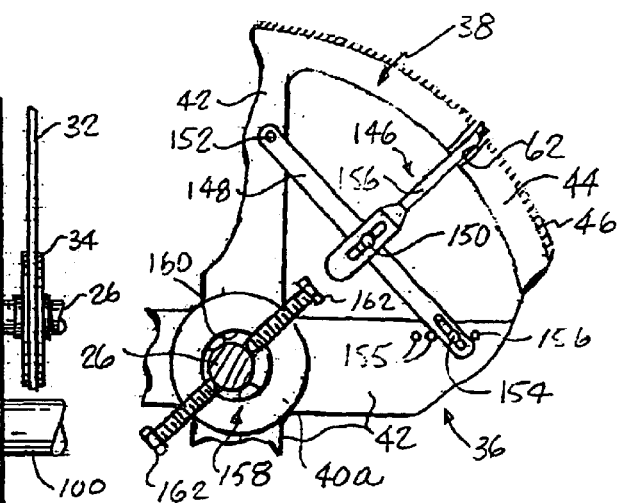
FIG. 6 is a fragmentary view similar to FIG. 4 and showing a modification of the radially movable whip carrying segments and an ex-center cleaning drum mounting device.

FIG. 6 shows a modified form of the previously described control assemblies 50 for controlling the radial extension of the arcuate segment plates 48. In this embodiment, the control assembly 146 includes a diagonal bar 148 mounted so as to extend between adjacent pairs of the spokes 42 of the wheel structure 38, and a pin 150 is transversely mounted on the bar intermediate its opposite ends. One end of the diagonal bar 148 is attached in a fixed position on one of the spokes 42 by a pivot pin 152 and the other end of the bar is slotted so that it can be attached by a pin 154 in a selected one of several holes 155 provided in the other spoke. This repositioning capability of the diagonal bar allows the transverse pin 150 to be moved radially and thereby adjust the radial travel of the rod 156 which extends normally from the diagonal bar as in the previously described embodiment. The radial extension of the arcuate segment plates 48 under the control of the assemblies 146 of this embodiment, and the control assemblies 50 of the previous embodiment, is used to compensate for wear of the abrading members 72; to alter the surface pressure applied on the products, and to adjust for products of different sizes. Also, by increasing rotational speed of the cleaning drum 36, the plates 48 can be moved radially to bring the abrading members 72 into position to clean the inner surface of the product carrier shell 78 which, for example, in the case of potatoes can become coated with a heavy starch build-up.

In addition to the second embodiment control mechanism 146, FIG. 6 shows an ex-center device 158 which can be used to mount the product cleaning drum 36 on the drive shaft 26. The ex-center device 158 can be provided in the hub of either of the wheels 38 or 39 or in the hubs of both of the wheels. The hub 40*a* shown in FIG. 6 is formed with an enlarged bore 160 and a pair of diametrically opposed set screws 162 are used to position the drive shaft 26 in an eccentric position within the bore of the hub 40*a*. In this manner, the cleaning drum 36 can be mounted with an adjustable eccentricity so that the drum wobbles when it is rotatably driven to alter the surface pressure applied on the products being processed.

The surface pressure applied on the products being processed can be adjustably controlled by changing the operation of the machine 10 as discussed below, so that the machine can be used to either clean and polish the products without disturbing the skin or to peel and remove surface imperfections. The application of surface pressure on the products can be altered by changing the rotational speed of the cleaning drum 36 and thereby increasing or decreasing the radial extension of the arcuate plate segments 48 and the abrading members 72 carried thereon. Changes can also be made by altering the differential rotational speeds of the cleaning drum 36 and the interconnected carrier shell 78 and collector bell 88 and by driving them in counter rotating or co-rotating directions. Further, the residence time, that is the time that the products are subjected to surface pressure in the cleaning space 80, can be varied to suit the particular type of products being processed and the desired surface treatment. For example, the feed rate, i.e., the rate at which product is fed into the machine, may be controlled by level controllers (not shown) in the vertical portion of product feed shoot 100. The machine 10 may be supported on adjustable legs 164 so that the machine can be tilted to change the angle of the rotational axis of the rotatably driven components relative to the horizontal.

Although the machine 10 is intended to operate without water, in some instances it may be necessary to inject some into the machine. For this purpose, a swivel connection device 166 is mounted on the drive shaft 26 at the product input end of the machine 10. The swivel connection device 166 has a pipe 168 extending therefrom for connection to a suitable source of water under pressure (not shown) for delivering the water to a longitudinally extending bore 170 provided in the drive shaft 26. The drive shaft has a plurality of radial apertures 172 formed along its length which communicate with the bore 170 so that water may be sprayed into the machine through the apertures.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and machines.

What I claim is:

1. A machine for treating the surfaces of food products comprising:
   a) a support frame;
   b) a cylindrical product carrier shell mounted in said frame and having a plurality of openings formed therethrough;
   c) a waste collecting bell coaxially circumscribing said carrier shell and sized to provide a waste collecting space therebetween, said collecting bell being mounted for rotation in said frame and connected to said carrier shell;
   d) a product cleaning drum mounted in said frame for rotation about a generally horizontal axis, said product cleaning drum having opposed product input and outlet ends and being coaxially mounted within said carrier shell and sized to provide an annular product cleaning space therebetween;
   f) abrading means mounted on said cleaning drum for rotation therewith and having extending abrading members for applying surface pressure on products when they are in the cleaning space between said cleaning drum and said carrier shell;
   g) a first drive means coupled to rotate said cleaning drum and a second drive means coupled to rotate said carrier shell and said collecting bell, said first and second drive means being independently operable at speeds wherein centrifugal force urges products when they are in the cleaning space between said cleaning drum and said carrier shell into bearing engagement with the inner surface of said carrier shell and expels waste materials through the openings formed in said carrier shell into the waste collecting space between said carrier shell and said collecting bell;
   h) product feed means for supplying products to the cleaning space between said cleaning drum and said carrier shell;
   i) product discharge means for receiving treated products from the cleaning space between said cleaning drum and said carrier shell; and
   j) waste material disposal means for receiving waste material from the waste collecting space between said carrier shell and said collecting bell.

2. A machine as claimed in claim 1, wherein the openings formed in said product carrier shell range in size from about one half inch to about two and one half inches.

3. A machine as claimed in claim 2, wherein said product carrier shell further comprises a liner of resiliently deformable frictional material on the inner surface of said carrier shell to completely cover the inner surface and underlay the openings formed therein, said liner having a plurality of openings formed in the areas thereof which underlay the openings formed in said carrier shell.

4. A machine as claimed in claim 1 wherein said waste collecting bell has an open end proximate said waste disposal means and is of frusto-conical configuration to provide a surface which diverges from proximate said product feed means to proximate the open end thereof so that waste material entering the waste collecting space under the influence of centrifugal force will impinge and slide along the diverging surface toward said waste disposal means.

5. A machine as claimed in claim 1, wherein said abrading means comprises:
   a) a plurality of arcuate plate segments proximate the periphery of said cleaning drum; and
   b) a plurality of radially extending control assemblies mounted in said cleaning drum with each of said control assemblies being connected to a different one of said plurality of arcuate plate segments, said arcuate plate segments responding to centrifugal force by moving radially from proximate the periphery of said cleaning drum under control of said control assemblies.

6. A machine as claimed in claim 5, wherein said plurality of arcuate plate segments are four in number.

7. A machine as claimed in claim 5, wherein the abrading members of said abrading means are in the form of an array of tufts disposed to substantially cover of each of said plurality of arcuate plate segments, with each of said tufts including a plurality of whips.

8. A machine as claimed in claim 1, and further comprising;
   a) a drive shaft mounted in said frame and coupled to said first drive means for being rotatably driven thereby, said drive shaft defining the generally horizontal axis about which said cleaning drum is rotatable; and
   b) said cleaning drum including,
      i) at least a pair of wheel structures each having a hub mounted on said drive shaft,
      ii) a plurality of spokes extending radially from the hub of each of said wheel structures,
      iii) a circular rim attached to the extending end of each of said spokes, and
      iv) a cylindrical body mounted on the rim of each of said wheel structure.

9. A machine as claimed in claim 8, and further comprising an ex-center device in the hub of at least one of the wheel structures of said cleaning drum for adjustably positioning said cleaning drum eccentrically on said drive shaft.

10. A machine as claimed in claim 8, wherein said abrading means comprises:
    a) a plurality of arcuate plate segments in circumscribing positions about the periphery of said cleaning drum; and
    b) a plurality of control assemblies mounted on each of said wheel structures, each of said control assemblies extending radially from its respective one of said wheel structures and being connected to a different one of said plurality of arcuate plate segments, each of said arcuate plate segments responding to centrifugal force by moving radially from the periphery of said cleaning drum under control of said control assemblies.

11. A machine as claimed in claim 10, wherein each of said plurality of control assemblies comprises:

a) a diagonal bar extending between adjacent ones of said plurality of spokes, said diagonal bar having a transverse pin intermediate its opposite ends;

b) a rod attached to said diagonal bar and extending radially through said circular rim and said cylindrical body of said wheel structure, said rod having its distal end connected to said arcuate plate segment and having a slot formed in its proximal end which engages the pin of said diagonal bar to allow radial movement of said rod and said arcuate plate segment under the influence of centrifugal force; and c) a pair of links extending tangentially from said rim to opposite sides of said arcuate plate segment to prevent deviations in the radial movement path of said arcuate plate segment.

12. A machine as claimed in claim 11, and further comprising:

a) a shoulder on said rod; and b) a compression spring extending between said shoulder and said rim of said wheel structure to bias said arcuate plate segment toward the periphery of said cleaning drum.

13. A machine as claimed in claim 11, wherein one end of said diagonal rod is selectively positionable on one of said adjacent pair of spokes to move the transverse pin radially to change the radial movement path of said rod and said arcuate plate segment.

14. A machine as claimed in claim 1, wherein both said first and said second drive means are variable speed and reversible drive mechanisms to allow independent variations in the rotational speeds of said cleaning drum and said interconnected carrier shell and waste collector bell and to allow co-rotational and counter rotational driving thereof.

15. A machine as claimed in claim 1, wherein said product feed means comprises:

a) a product feed chute mounted in said frame;

b) a frusto-conical nose cone formed on the product input end of said cleaning drum; and c) a frusto-conical nose cone formed on said carrier shell and circumferentially spaced about said nose cone of said cleaning drum to provide a transition space through which the products to be treated are moved from said product feed chute into the cleaning space between said product cleaning drum and said carrier chute.

16. A machine as claimed in claim 15, and further comprising:

a) said nose cone of said carrier shell having a plurality of openings formed therein; and d) abrading whips extending from said nose cone of said cleaning drum into the transition space between said nose cones of said cleaning drum and said carrier shell to dislodge dirt and other debris from the products being moved therethrough, the dislodged dirt and other debris exiting the transition space through the openings formed in said nose cone of said carrier shell under the influence of centrifugal force.

17. A machine as claimed in claim 16, wherein said nose cone of said carrier shell is formed with a frictional surface that faces into the transition area with the products to be treated being urged into bearing engagement therewith under the influence of centrifugal force.

18. A machine as claimed in claim 16, wherein said abrading whips on said nose cone of said cleaning drum gradually increase in length and stiffness between the small and the large ends of said nose cone to gradually introduce the products to be treated to abrading surface pressure.

19. A machine as claimed in claim 1, wherein said product discharge means comprises a product collection cowling at the product outlet end of said cleaning drum for receiving products that have been treated, said cowling enclosing the end of the cleaning space between said cleaning drum and said carrier shell and having a product delivery chute through which products exit the machine.

20. A machine as claimed in claim 1 wherein said product discharge means comprises:

a) a product collection cowling at the product outlet end of said cleaning drum for receiving products that have been treated, said cowling enclosing the end of the cleaning space between said cleaning drum and said carrier shell;

b) a product delivery chute at the bottom of said product collection cowling; and c) an idler wheel mounted for free wheeling rotation within said product collection cowling for receiving products on its peripheral surface and easing them downwardly toward said product delivery chute.

21. A machine as claimed in claim 1, wherein:

a) said waste collecting bell is of frusto-conical configuration to provide an inner surface that diverges toward its larger open end so that waste material entering the waste collecting space will impinge and slide along the inner surface toward the open end of said collecting bell; and b) said waste disposal means includes a waste discharge trough proximate the open end of said collecting bell to catch waste materials that fall from the open end thereof.

22. A machine as claimed in claim 21, wherein said waste disposal means further comprises a) a scraper at the open end of said collecting bell for removing waste materials that are stuck to the inner surface thereof; and b) a waste scraper trough mounted to receive the waste materials removed by said scraper and to carry them out of the machine.

23. A machine as claimed in claim 1, wherein:

a) said waste collecting bell is of frusto-conical configuration and having its larger end open;

b) a dust collector cowling proximate the large open end of said waste collecting bell and configured to enclose the adjacent end of the waste collecting space; and c) a pipe extending from said dust collector cowling for connection to a source of negative pressure to provide a partial vacuum within said dust collector cowling.

24. A machine as claimed in claim 1, wherein:

a) said collecting bell is formed of two interconnected pieces that provide an annular opening intermediate the opposite ends of said collecting bell;

b) a dust collector cowling is circumferentially mounted on said collecting bell and disposed to enclose the annular opening formed therein; and c) a pipe extends from said dust collector cowling for connection to a source of negative pressure to provide a partial vacuum within said dust collector cowling.

25. A machine as claimed in claim 1, wherein said frame is supported on adjustable legs for changing the angle of the axis of rotation of said cleaning drum and said interconnected carrier shell and collecting bell.

* * * * *